July 23, 1963 J. L. RADOS ETAL 3,098,514
CONTINUOUS WOOD LAMINATING PRESS
Filed Sept. 20, 1961 5 Sheets-Sheet 1

INVENTORS.
Theodore R. Drake
John L. Rados
BY

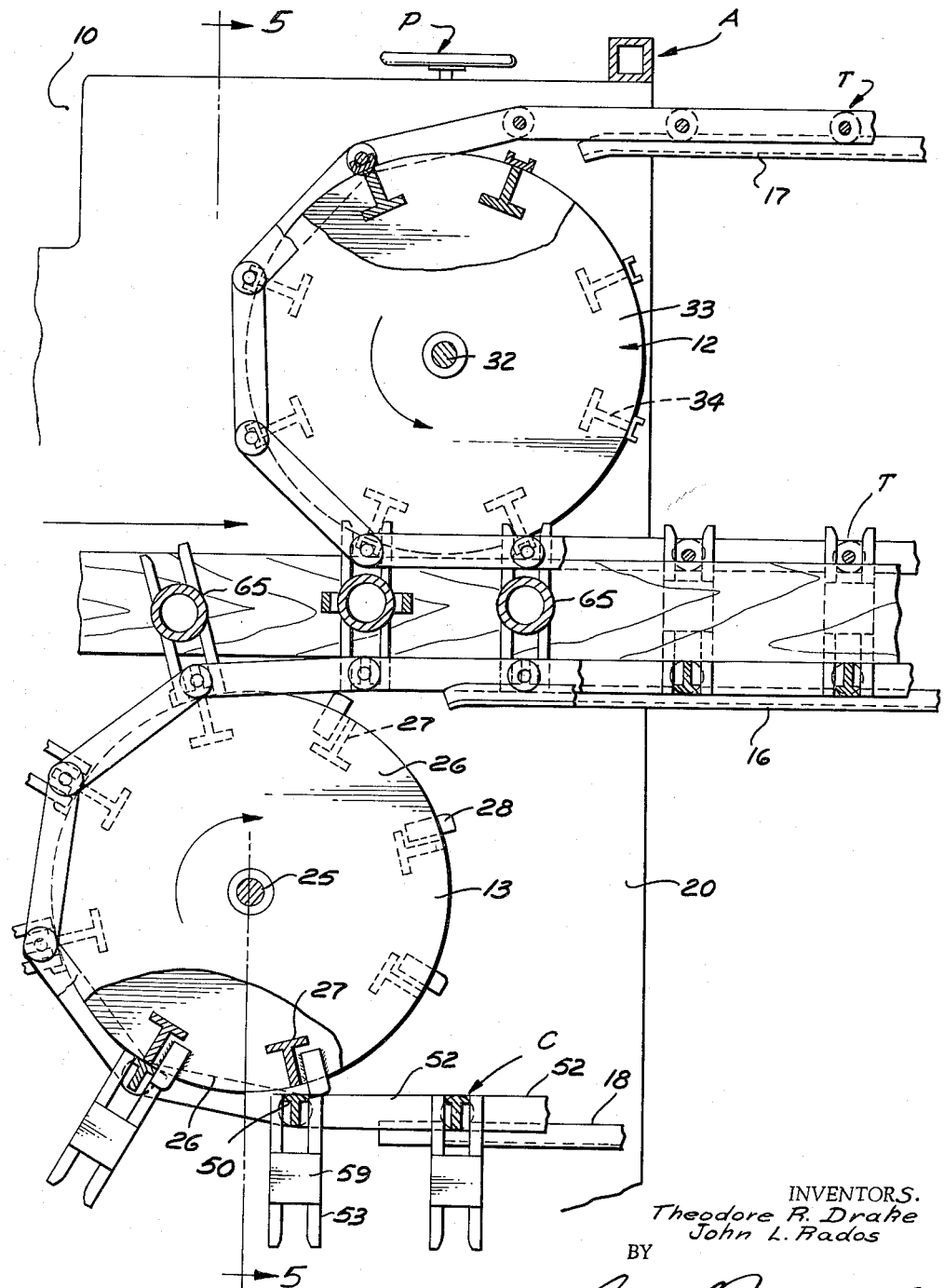

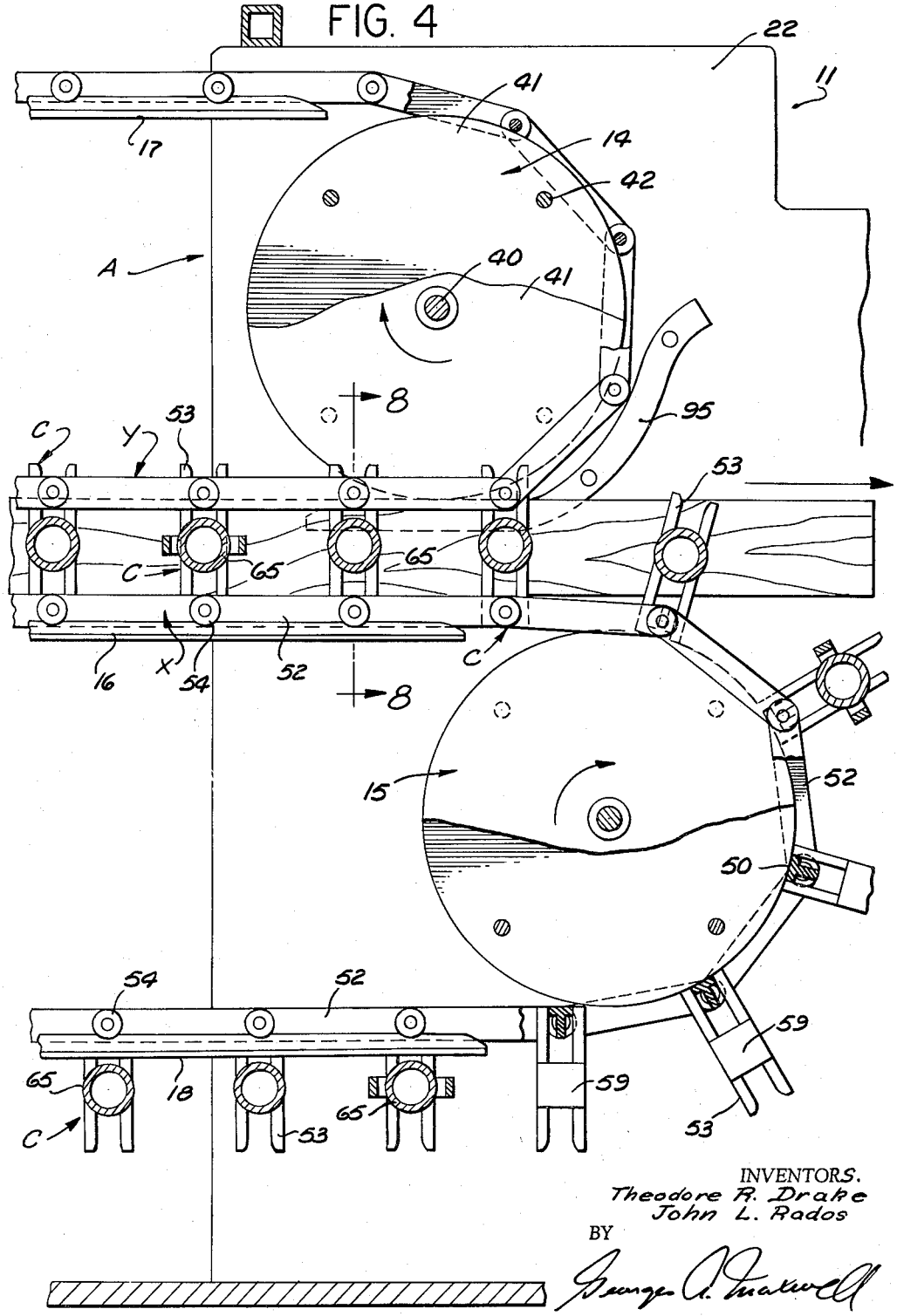

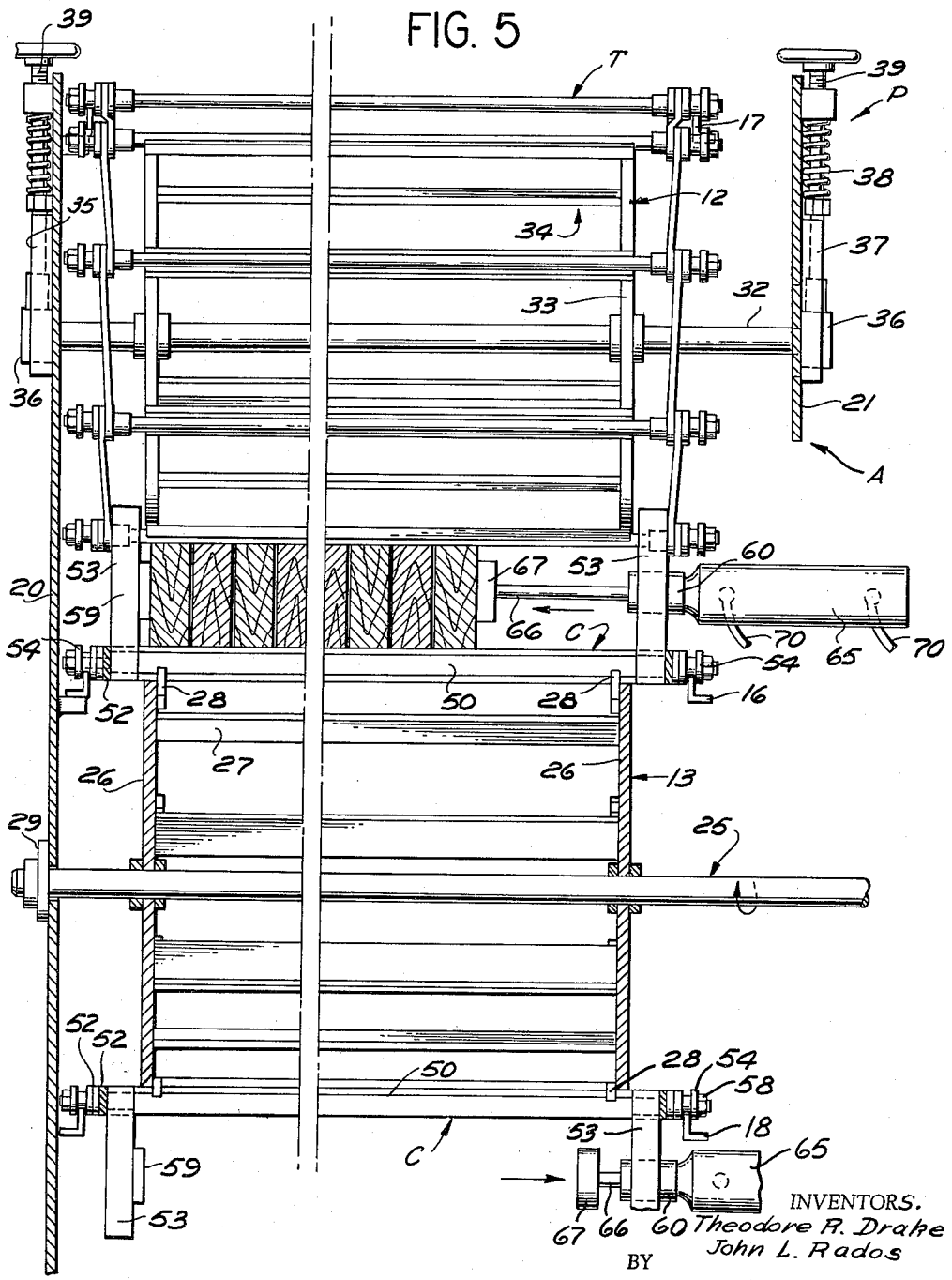

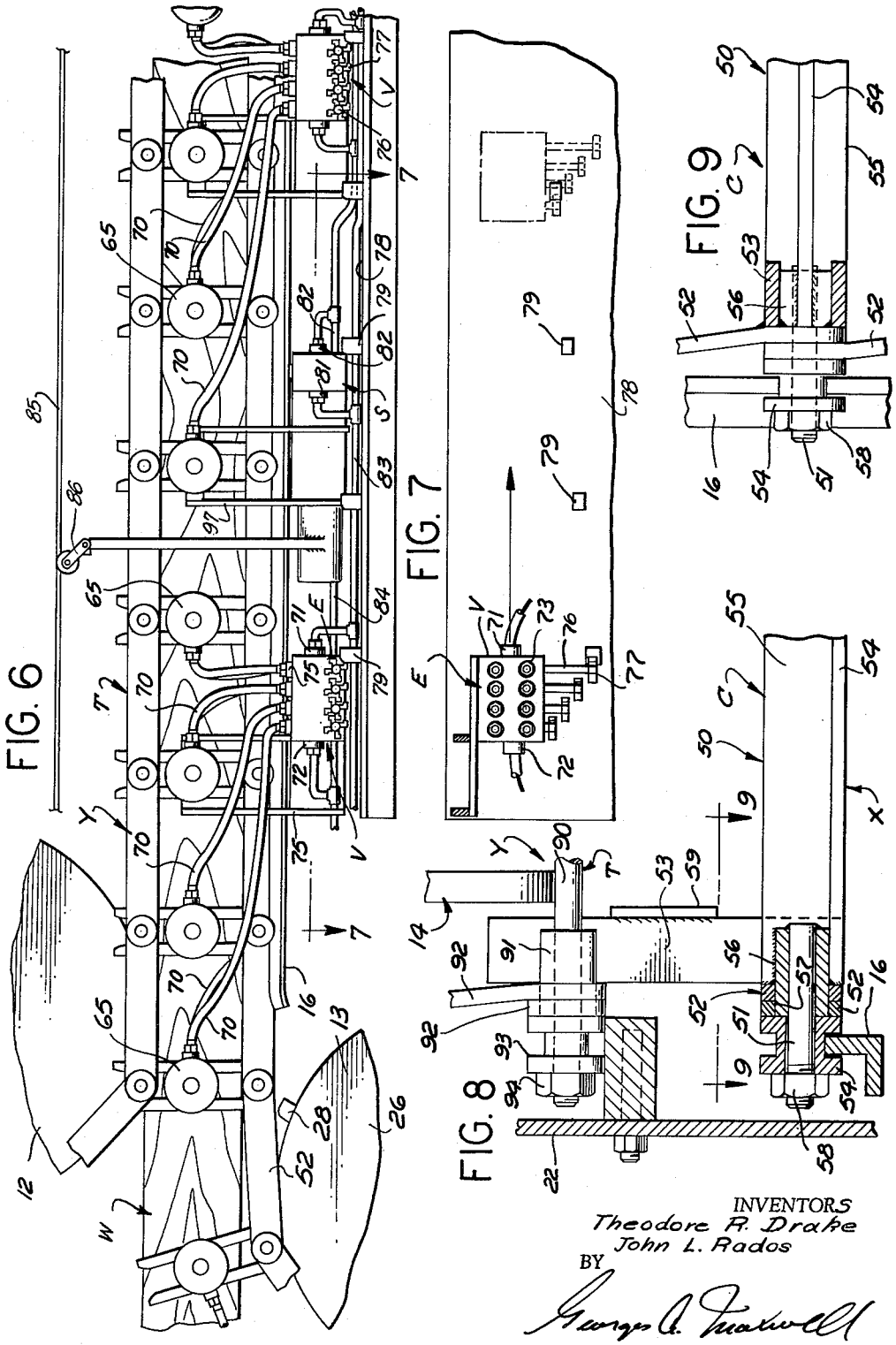

United States Patent Office 3,098,514
Patented July 23, 1963

3,098,514
CONTINUOUS WOOD LAMINATING PRESS
John L. Rados, 2209 Dalodies Drive, San Pedro, Calif., and Theodore Roosevelt Drake, 1780 Crestview, Seal Beach, Calif.
Filed Sept. 20, 1961, Ser. No. 139,501
20 Claims. (Cl. 144—281)

This invention relates to a press, and is more particularly concerned with a novel, continuous press for manufacturing laminated wood beams, slabs, and the like.

For many years it has been common practice to establish large wooden beams or slab-like wood structures by laminating a plurality of small boards in side-by-side and end-to-end relationship. The boards are either scabbed together by suitable fastening means, such as nails, bolts, and the like, glued together, or both. Such beams or slabs can be advantageously employed in a multitude of structures and are superior in many respects to structural steel.

In order to assure proper lamination of wooden beams, it is necessary that the component boards be glued together, and that adequate pressure be applied and maintained on the stack of boards while the glue is curing or drying, so as to assure a proper, uniform, continuous bond.

It is common practice to apply such pressure by means of a plurality of separate, manually operable, mechanical clamping devices. This practice is extremely slow, it is not uniform, requires a great number of clamping devices, and a considerable number of persons to operate them, all to the end that such products are extremely costly to manufacture.

Still further, in the production of laminated wooden beams, or slabs, in the manner set forth above, considerable skill is required in aligning and positioning the individual pieces of wood and necessitates the use of select lumber of considerable and standard lengths.

In following the conventional manner of producing such a product the length of the beam or slab produced is, from a practical standpoint, limited. Each beam or slab is especially built to specification.

Throughout the world, there is a great quantity of lumber which, due to its short length, is considered of little or no use, such lumber being commonly referred to as shorts.

Each year, many millions of board feet of lumber, in the form of shorts, is destroyed and wasted, or is sold at a much reduced price. The use of shorts for producing laminated beams, and the like, has been often considered, but has always been rejected due to the increased labor costs in handling and manipulating such stock.

Attempts have been made to provide continuous wood laminating presses, that is, presses into which wood stock, coated or painted with a suitable glue, can be fed and which will discharge a continuous laminated wood product, such as a beam or slab. The principal difficulty to be overcome in such machines is to maintain the necessary or required pressure on the stack of lumber going to make up the beam, over a prolonged period of time so as to allow for setting and/or curing of the glue, and yet allow for continuous lineal movement of the stack through the machine.

Past attempts to provide such a machine have included longitudinal rows of opposing pressure plates or platens between which the stack of wood is urged. Such constructions have proven unsatisfactory for several reasons. For example, when adequate pressure is exerted by the plates or platens upon the stack of wood, the frictional resistance becomes so great that the stack of wood cannot be urged between the plates without crushing and mutilating the end of the stack upon which pressure must be exerted to urge the stack longitudinally and without galling the surfaces of the stack which oppose the plates. Further, such machines must necessarily be of extremely heavy and costly construction.

Attempts to overcome these problems have included the provision of rollers in place of the plates. However, such attempts have proven unsatisfactory since rollers tend to crush the stock as it is advanced by them. Still other attempts, which have proven to be of limited success in certain situations, have involved pairs of endless belts or chains to occur at the opposite sides of the stack of lumber or veneer and having plates carried thereby to engage the adjacent sides of the stack, and pressure means related to each chain and urging the chain and the plates thereon into pressure engagement with the stack of wood. The pressure means in such constructions is stationary, is of considerable longitudinal extent, and requires that the stack of wood, with the chains and the plates related thereto, be urged thereby. With these constructions, considerable force is required to shift the assembly between the pressure means. The pressure means in such constructions is inflexible longitudinally of the construction, so that it is impossible to compensate for soft points along the longitudinal extent of the stack. That is, points which, due to soft boards, will compact more, under the required pressure, than the remainder of the stack.

Due to the fact that each piece of lumber of like grade and quality has its own unique resistance to being compacted, and such resistance varies throughout the longitudinal extent thereof, and, further, due to the fact that when several pieces of lumber are stacked and pressure is applied thereto, as for the purpose of laminating the lumber, the extent to which the stack will compress or compact, at various points along its longitudinal extent, will vary widely. Continuous presses which do not afford independent application of pressure at points along the longitudinal extent of the stack of lumber, and which do not allow for maintaining such pressure at such points uniformly for the required length of time, cannot provide a laminated wood product of uniform quality.

In the case of continuous presses for laminating slabs, where pressure must be applied to the opposite side edges of the stack, the stack tends to bow or buckle intermediate the said side edges thereof. Accordingly, means must also be provided to hold the stack flat. In continuous presses provided by the prior art, the stacks are held flat by stationary platens and the like between which the stack must be urged. The frictional resistance afforded by such means is considerable and is cumulative with the resistance afforded by the remainder of the construction.

An object of our invention is to provide a novel continuous press adapted to receive and to simultaneously press and transport a stack of lumber which has been glued, for the purpose of establishing an elongate continuous laminated beam or slab.

Another object of the present invention is to provide a novel press of the character referred to including longitudinally shiftable clamping means which engage and clamp lumber placed in the press in stacked relationship and maintain fixed clamping engagement with the stack of lumber as it travels and is advanced through the press.

Still another object of this invention is to provide a press or machine of the character referred to wherein the clamping means exerts pressure on the stack of lumber in two planes, at right angles to each other.

It is another object of the present invention to provide a plurality of like, elongate, independently operable clamping means arranged in longitudinal spaced relationship in the machine to extend transversely thereof and pivotally connected together in spaced parallel relationship.

It is a further object of our invention to provide clamping means of the character referred to including two separable portions, the like portions of the several clamping means being independently pivotally connected to establish endless chain-like series of such portions.

Still another object of the present invention is to provide means for supporting the two endless series or chains of the clamping means, means for moving and turning said series of portions longitudinally of the machine, and means for urging said portions into and out of engagement with each other and with the stack of lumber being handled.

It is an object of this invention to provide a machine of the character referred to wherein each clamping means includes a hydraulic cylinder and ram unit, control means for selectively energizing the cylinder and ram units and pumping means for supplying fluid under pressure to the said cylinder and ram units.

The various objects and features of our invention will be fully understood from the following detailed description of a typical preferred form and application of my invention, throughout which description reference is made to the accompanying drawings, in which:

FIG. 3 is a sectional view of one end of our new press taken as indicated by line 3—3 on FIG. 1;

FIG. 4 is a sectional view of the other end of our new press, taken as indicated by line 4—4 on FIG. 1;

FIG. 5 is a sectional view taken substantially as indicated by line 5—5 on FIG. 3;

FIG. 6 is an enlarged side elevational view of a portion of the structure shown in FIG. 2;

FIG. 7 is a view taken as indicated by line 7—7 on FIG. 6;

FIG. 8 is an enlarged detailed sectional view taken substantially as indicated by line 8—8 on FIG. 4;

FIG. 9 is a view taken as indicated by line 9—9 on FIG. 8.

Figure 1:
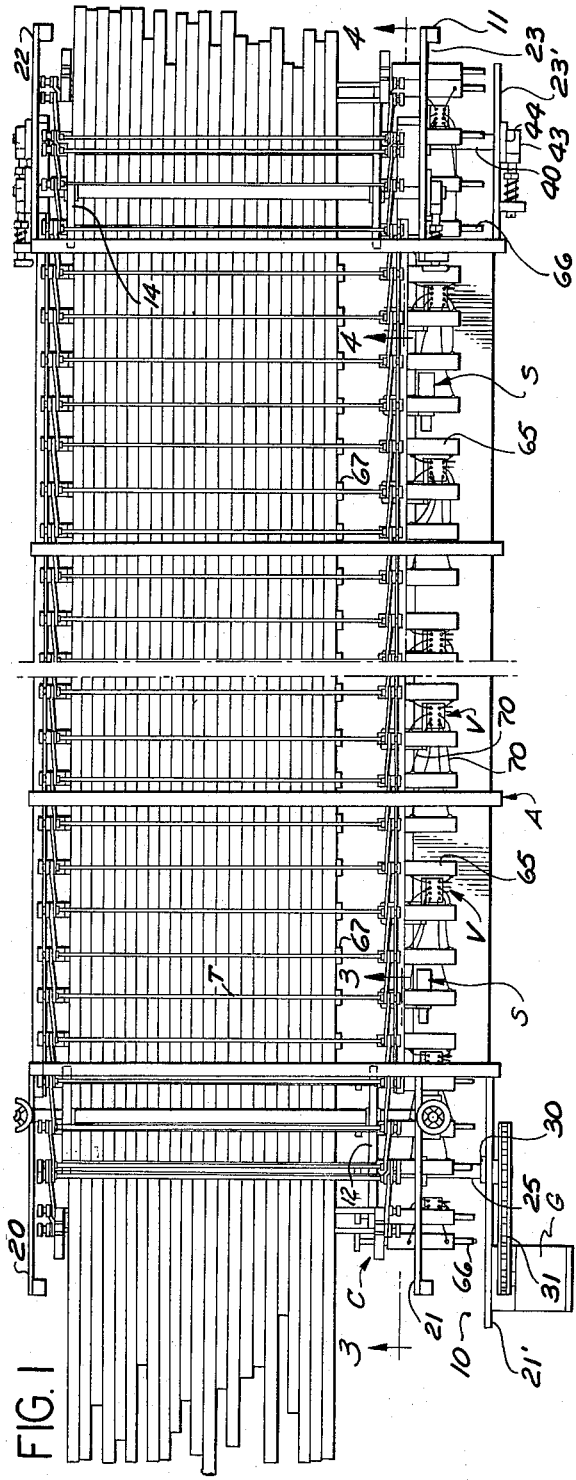
FIG. 1 is an elevational plan view of our new continuous press.

The continuous press that we provide is adapted to receive a plurality of boards of random lengths and suitably glued, in side-by-side and end-to-end relationship, and to initially clamp the boards in a horizontal plane and subsequently exert lateral uniform clamping pressure on and through the stack of boards and transport the said stack of boards longitudinally of the press, thus clamped, at a predetermined rate, so as to permit the glue to set and cure, and to then discharge the boards in the form of a unitary, continuous, laminated beam or slab.

The press or machine is designed to handle boards of standard cross sectional dimensions, such as two by fours or two by sixes, and the like, and is such that boards of any length can be advantageously handled, such as shorts which are presently considered waste or of little or no value.

In practice, a specially constructed scarfing machine, a gluing apparatus, and a feeding device are used in connection with the machine of the present invention, to scarf the ends of the boards being used, apply glue to the necessary surfaces of the boards, and to drive the boards longitudinally into tight engagement with the stack as they are fed into the front end of the machine. Since these pieces of equipment are accessories, and collateral to the instant invention, we will not burden this specification with further unnecessary consideration thereof.

The continuous press that we provide includes, generally, an elongate horizontally disposed frame A having front and rear ends 10 and 11, upper and lower feed rollers 12 and 13 at the front end of the frame, upper and lower discharge or return rollers 14 and 15 at the rear end of the frame, a pair of laterally spaced central supporting tracks 16 supported by the frame and extending between the front and rear rollers on a plane substantially tangential with the top of the lower rollers, a pair of upper laterally spaced, and a pair of lower laterally spaced, return tracks 17 and 18, supported by and extending longitudinally of the frame, between the rollers at the ends thereof, and on planes substantially tangential with the tops of the upper rollers and the bottom of the lower rollers, respectively.

The press further includes a plurality of like elongate clamping unit C, arranged in longitudinal spaced relationship relative to the frame, to extend transversely thereof and pivotally connected to each other to establish an elongate endless clamp chain X, which is engaged about and extends between the lower rollers 13 and 15, and which is supported by the tracks 16 and 18.

The construction further includes a plurality of like elongated tie members T spaced longitudinally of the frame to extend transversely thereof, and adapted to releasably engage one of the clamping units C. The several tie members T are pivotally connected to each other to establish an elongate endless tie-chain Y. The tie chain Y is engaged about and extends between the upper rollers 12 and 14 and is supported intermediate the rollers by the upper return track 17 and the clamping chain X with which it engages, as will be described. Each clamping unit C includes a hydraulic cylinder and ram supplied with fluid under pressure by a suitable fluid supply means S related to the chain X, and which is under control of a suitable valving means V, as will be described.

Other means related to the basic set-up set forth above are provided and will be noted in the following description.

The frame A that we provide is an elongate fabricated structure made up of plate, T, strap, and angle steel.

The front end of the frame is characterized by a pair of laterally spaced vertically disposed plates 20 and 21, occurring at the left and right hand sides of the frame, which plates connect with and support the front ends of the several tracks and on and between which the feed rollers 12 and 13 are rotatably mounted.

In practice, the righthand plate 21 is divided intermediate its upper and lower ends, and the lower portion 21' thereof is spaced laterally outwardly from the upper portion, to accommodate the cylinder and ram units on the lower clamp chain X, as will be apparent from the drawings.

The rear end of the frame, like the front end, is characterized by a pair of laterally spaced vertically disposed plates 22 and 23 occurring at the left and right hand sides of the frame, which plates connect with and support the rear ends of the several tracks and on and between which the return rollers 14 and 15 are rotatably mounted.

Figure 2:
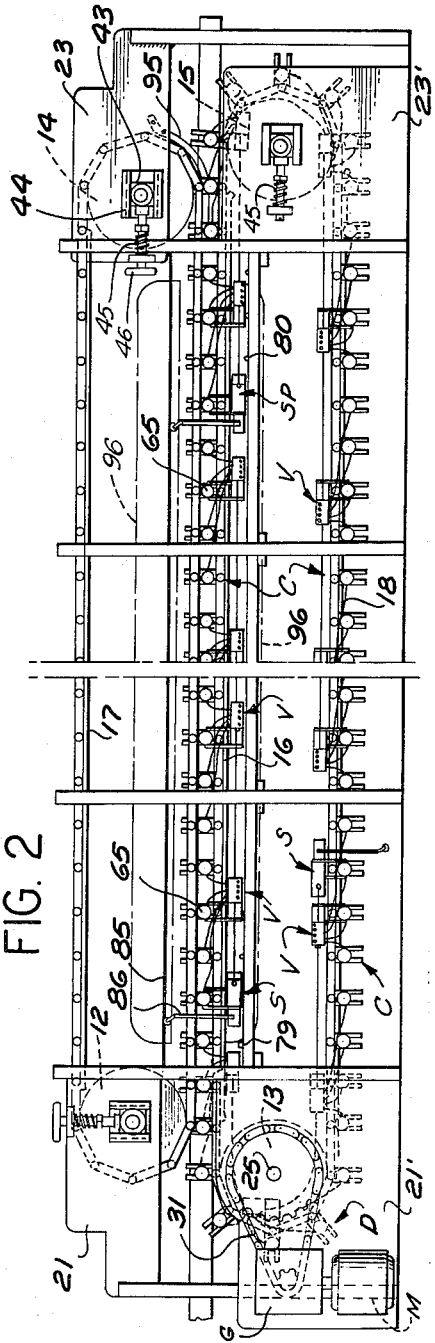
FIG. 2 is a side elevational view of our new press.

The righthand rear plate 23, like the righthand front plate 21, is divided and the lower portion 23' thereof is offset laterally outwardly to accommodate the cylinder and ram units on the clamp chain (see FIGS. 1 and 2).

The plates at both ends of the frame are held in fixed spaced relationship by suitable steel straps and bars extending transversely of the frame and fixed to the plates, as by welding. The several tracks 16, 17 and 18, are formed of lengths of angle or T sections, each having an upwardly projecting web or flange to establish a supporting edge.

The ends of the tracks are fixed to their related plates, as by welding, and are supported and held in fixed spaced relationship intermediate their ends by suitable rods, beams, gussets, and the like, as circumstances require.

The rails or tracks constitute structural elements of the frame per se.

Since the exact nature of the remaining structure of the frame can very widely without in any way affecting the novelty of the present invention, we will not burden this application with further illustration and description thereof.

The lower feed roller 13 is an elongate horizontally disposed structure extending transversely of the frame, between the plates 20 and 21', and includes an elongate central axle member 25, a pair of axially spaced discs 26, a plurality of elongate circumferentially spaced clamp supporting stringers 27, fixed to and extending between the discs, and radially outwardly projecting clamp engaging dogs 28 on the discs, adjacent each stringer.

The stringers are load supporting members, adapted to engage and support the clamping units C throughout their major longitudinal extent, as will be apparent from examination of the drawings, and as will be apparent from the following description.

The left end of the axle member 25 is rotatably supported in a suitable bearing 29 on the plate 20 of the frame A, while the right end of the axle member 25 projects through an opening in the plate 21' and is rotatably supported by a suitable bearing 30 mounted on said plate 21'.

A suitable drive means D, including an electric motor M and a reduction gear G, is mounted on the outer side of the plate 21' of the frame, and a suitable chain drive 31 is provided between the reduction gear and the outer righthand end of the axle member 25, as clearly illustrated in FIGS. 1 and 2 of the drawings.

The reduction gear G is such that the rate at which the feed roller 13 is driven can be varied, as circumstances require.

With the above construction, it will be apparent that the lower support or feed roller 13 is driven and serves to drive the chains X and Y and to advance the stack of wood being handled longitudinally rearwardly through the press.

The upper feed roller 12 is an elongate horizontally disposed structure extending transversely of the frame A, between the plates 20 and 21 thereof, and includes an elongate central axle member 32, a pair of axially spaced discs 33, and a plurality of elongate, circumferentially spaced tie-bar engaging stringers 34 fixed to and extending between the discs. The stringers 34 are pressure-exerting and driving members, adapted to establish driving engagement with the tie members T and to urge the tie members into pressure engagement on the stack of wood W.

Each stringer 34 is provided with a radially outwardly opening channel 35 adapted to cooperatively receive the member T.

The ends of the axle member 32 are rotatably supported in suitable bearings 36 carried by suitable vertically shiftable pressure means P mounted on the plates 20 and 21. In the case illustrated, the means P related to each end of the axle member 32 includes a vertically extending way 37 fixed to its related plate 20 or 21, in which the bearing 36 is slidably engaged, and spring means 38 with an adjustable screw 39 related to the way and normally yieldingly urging the bearing, and the roller supported thereby, downwardly.

With this relationship of parts it will be seen that the roller 12 is in the nature of a pressure roller.

Since the pressure means P can vary widely in form without affecting the novelty of this invention, we will not burden this specification with further illustration and description thereof.

A roller 12 is spaced rearwardly and above the roller 13 a sufficient distance to properly accommodate the chains X and Y and the wood W, and to afford proper engagement of the tie members with the clamps, as will be described hereinafter.

The return rollers 14 and 15 at the rear end of the frame are substantially alike, each including a central axle member 40, a pair of axially spaced discs 41, and a plurality of stringers 42 fixed to and extending between the discs. The discs 41 of the roller 14 serve to engage and guide the tie members T of the chain Y while the discs of the roller 15 engage and guide the clamps C of the chain X.

The ends of the axle member 40 of the rollers 14 and 15 are rotatably supported in suitable bearings 43, which bearings are slidably carried in suitable longitudinally extending ways 44 carried by the plates 22, 23 and 23'. Suitable spring means 45 with adjustable screws 46 are related to each of the ways and bearings, and serve to normally urge the bearings and the rollers 14 and 15 longitudinally rearwardly relative of the frame, so as to take up slack in the chains X and Y which might develop as a result of expansion or wear.

The particular pressure means for urging the rollers 14 and 15 rearwardly, set forth above and illustrated generally in FIGS. 1 and 2 of the drawings, is substantially the same as the pressure means P related to the roller 12, and, as mentioned with respect to the means P, can be varied widely in form and construction without in any way affecting the novelty of the present invention.

As regards the pressure means related to the return rollers 14 and 15, it is only necessary that they be such as to afford longitudinal shifting of the rollers and they need not be spring-loaded.

The plurality of U-shaped clamping units C going to make up the clamp chain X are alike and each includes an elongate, horizontally disposed beam 50 extending transversely of the frame, a spindle 51 projecting axially from each end of the beam, an elongate apertured link 52 fixed to and projecting rearwardly in the direction of travel of the chain, at each end of the beam arranged inwardly of the spindle and the link related thereto, and a track engaging roller or wheel 54 rotatably carried by each spindle.

The beam 50 of each clamping unit C is shown as being formed of a single length of T-section, with its base 54 disposed downwardly and its leg 55 projecting upwardly and establishing a wood-engaging supporting edge.

The spindles 51 are simple, cylindrical pins or rods fixed in suitable bushings 56 which bushings are fixed to the ends of the beam as by welding. The bushings 56 project a limited distance from the ends of the beams to accommodate and receive the links 52. The links 52 are simple elongate steel straps fixed to the ends of the beams 50, as by welding. The ends of the links fixed to the beams are provided with openings to receive the bushings 56, while the forward ends of the links are provided with openings 57 to slidably receive the bushings 56 on the next, forward, clamping unit C.

The rollers or wheels 54 are simple steel spools rotatably engaged on the spindles 51, and retained thereon in running engagement against the ends of the bushings by suitable nuts 58 threadedly engaged on the outer ends of the spindles.

The yokes 53 are established by a pair of longitudinally spaced upwardly projecting steel straps fixed to the opposite sides of the bushings and the beams, as by welding. The straps are arranged so that they establish what may be considered front and rear legs, and so that the yokes open upwardly and laterally.

In addition to the foregoing, the yokes at the left ends of the beams 50 are provided with laterally inwardly disposed wood-engaging pads 59 and the yokes at the right ends of the means are provided with cylindrical mounting tubes 60 for the cylinder and ram units, as will hereinafter be described.

The pads 59 are simple, flat, steel plates fixed to the yokes as by welding, while the mounting tubes 60 are simple, straight, steel tubes of limited longitudinal extent engaged between the front and rear legs of their related yokes and fixed thereto, as by welding.

From the foregoing, it will be apparent that each clamp unit is, in effect, an elongate, normally upwardly opening, longitudinally operated C-clamp having supporting rollers at its opposite ends, and having the outer ends of the legs thereof, which correspond to the yokes set forth above, bifurcated, to cooperatively receive a tie member.

The rollers or wheels 54 of the units C occurring at the upper portion of the chain X engage the track 16, which track serves to support the upper portion of the chain, the wood being handled by the press and the lower portion of the chain Y, as will be hereinafter described. The rollers or wheels 54 of the units C at the lower portion of the chain engage the return track 18, which track serves to simply support the said lower portion of the chain as it is returned to the forward or front end of the press.

The peripheral edges of the discs 26 and the stringers 27 of the lower forward feed roller 13 engage and support the beams 50 of the unit C as they advance around the forward end of the press. The dogs 28 on the roller discs 26 engage the trailing edges of the beams 50 and serve to position the beams adjacent the stringers and to establish driving engagement between the chain X and the said roller 13.

The peripheral edges of the discs 41 of the lower rear return roller 15 engage the beams of the units C and serve to guide the units C from the track 16 onto the track 18 as the chain X is advanced. Further, the roller 15, being adjustable longitudinally of the frame A and spring-loaded toward the rear end of the construction, serves to maintain the chain X in proper tension longitudinally of the frame.

In addition to the foregoing, each unit C further includes a jack-type pressure exerting means. In the case illustrated, the pressure exerting means is shown as including, a double-acting hydraulic cylinder and ram unit. Each of said units includes a cylinder 65 and a ram 66. The cylinder 65 related to each unit C is arranged adjacent the outer side of the righthand yoke and has one end threadedly engaged or otherwise mounted on or fixed to the mounting tube 60. The ram 66 projects laterally inwardly from the cylinder through the tube 60 and is provided at its inner end with a wood engaging pressure plate 67, which plate is spaced from and opposes the pad 59 on the opposite yoke.

Each cylinder has a fluid port at each end connected with a flexible fluid-conducting hose 70, which hose extends to and connects with the valving means V, as will be described.

When the cylinder and ram units occur at the top of the chain X and are energized to exert pressure on the stack of wood W, the outer end portions of the rams are shifted into the cylinder throughout their major longitudinal extents. However, when the said units occur adjacent the rollers at each end of the frame, and at the bottom side of the chain, the cylinder and ram units are reversed, or energized to shift out of engagement with the stack of wood, and the outer end portions of the rams 66 thereof project a substantial distance outward from the cylinders and the chain X. With the above relationship of parts it will be apparent that considerable clearance must be provided between the lower rollers 13 and 15 and the righthand side of the frame, to accommodate the cylinder and ram units carried by the chain X. It is for this purpose that the lower portions 21' and 23' of the plates 21 and 23 of the frame are offset, as set forth above and as clearly illustrated in the drawings.

Since the exact nature and design of the cylinder and piston units related to each clamp unit can vary widely without affecting the novelty of the invention, we will not burden this application with detailed illustration and description thereof.

The valving means V that we provide is shown as including a plurality of distributor blocks E fixed to and carried by the chain X at spaced intervals. Each block E has a fluid inlet fitting 71 and fluid outlet fitting 72 and four pairs of delivery fittings 73, each under control of a suitable valving mechanism with which the lines 70, connected with the cylinders 65, are coupled. The valving mechanisms are individually mechanically actuated to selectively establish communication between the inlet fitting and one of the delivery fittings, and between the outlet fitting and the other delivery fitting of each pair of said delivery fittings.

With the above set-up, it will be apparent that, by actuating the valve mechanism related to each cylinder, fluid under pressure can be selectively introduced into either end of the cylinder and exhausted from the other end, so as to shift the ram 66, with the plate 67 thereon, into and out of engagement with the wood W.

Each distributor block E, having four pairs of delivery fittings 73, is capable of delivering and receiving fluid from four clamping units C. In the case illustrated every fourth clamping unit C is provided with a suitable mounting bracket 75 on which a distributor block E is mounted.

The blocks are shown as simple, substantially cubicle structures, and are supported by the mounting brackets 75 to occur laterally outward of the chain X and in spaced relationship below the cylinders 65 related thereto.

The valve mechanism related to each pair of delivery fittings includes an elongate stem 76 which projects laterally outwardly from the block E and on which is mounted a suitable star wheel 77. The stems 76 of each block E are of varying lengths so that the star wheels 77 fixed to the ends thereof occur in and travel along laterally spaced vertical planes with respect to the longitudinal axis of the construction.

Extending longitudinally of the frame A and positioned below the plane in which the distributor blocks at the upper part of the chain X travel, is an elongate platform 78. On the forward end of the platform 78 is mounted a plurality of longitudinally and laterally spaced upwardly projecting actuating lugs 79 which lugs are adapted to selectively engage and rotate the star wheels 77 of the valving mechanism as the block advances thereby, and so as to actuate the cylinders and rams of each clamping unit, so as to exert pressure on the wood W, when each clamping unit reaches a predetermined position, that is, when each unit has advanced beyond or rearward of the roller 13 and is supported by the track 16. At the rear end of the platform is a similar group and arrangement of lugs 80 which serve to engage the star wheel 77 so as to actuate the cylinders and rams of each unit to release the pressure exerted on the work, and to shift the pressure plates thereof away from the wood when each clamping unit reaches a predetermined position at the rear end portion of the press and before it advances into engagement with and around the return roller 15.

In practice, the valving means V and the means employed to operate it can vary widely in form, without in any way affecting the novelty of the invention. For instance, a separate valving means could be related to each cylinder 65 and could be under control of any suitable mechanical or electrical operating means.

Since the particular valving means V and controls therefor can vary widely in form and construction and, to a great extent, are a matter of choice, further consideration of the particular means shown will not be undertaken.

The fluid supply means S includes a plurality of like motor-pumps carried by the chain X, each having discharge and return fittings 81 and 82. The motor pumps are arranged in spaced relationship about the circumferential extent of the chain X. A continuous supply hose 83, coextensive with the circumferential extent of the chain X and connected with the discharge fittings of the several pumps, and the inlet fittings of the several distributor blocks E, is provided to conduct fluid to the several valving means, and a continuous return hose 84 coextensive with the circumferential extent of the chain X and connected with the return fittings 82 of the several motor pumps and the outlet fittings of the several distributor blocks is provided to conduct fluid from the valving means to the pumps (see FIG. 6).

The motor pumps are supplied with current through an electrically energized rail 85, carried by the frame to occur above the upper portion of the chain X, and a trolley 86 carried by each motor pump and which engages the rail 85 as the said motor pump travels rearwardly.

In practice, it is necessary that at least one motor pump be energized at a time. Accordingly, it is necessary that there be at least three such pumps, spaced circumferentially about the chain X.

The several motor pumps, like the distributor blocks E, are mounted on and carried by suitable mounting brackets 97 provided on certain of the clamping units C. With the above relationship of parts, it will be apperent that each of the clamping units C is energized into clamping engagement with the wood W being handled, as soon as it leaves the lower feed roller 13, and remains energized to exert pressure on the wood until it approaches the lower return roller 15, whereupon it reverses and is energized to shift out of pressure engagement with the wood. It remains out of engagement with the wood, that is, in its unactuated position, as it travels about the roller 15 forwardly along the track 18 and thence about the roller 13.

In practice, if it is desired or found necessary, suitable fluid or pressure accumulators can be provided in the hose 82 or hose 83, or both. Such accumulators can be simple tank-like units and, like the distributor blocks and motor pumps, would be mounted on certain of the clamping units C by means of suitable mounting brackets.

It will be noted that with the structure thus far considered, pressure can be exerted upon the wood W laterally of the press, by the several clamping unit C, but that vertical pressure is not applied thereto and the wood stack is not suitably retained against buckling or bowing between its opposite side edges. Further, the clamping units C are such that the outer ends of the yokes thereof are unsupported and the units, each as a whole, are subject to adverse yielding flexing, and/or springing.

The tie units T going to make up the chain Y and the feed and return rollers 12 and 14 related thereto, serve to overcome the above factors, that is, they serve to exert vertical pressure on the stack of wood as it is introduced into the press at the forward end thereof, retain the stack in a flat horizontal plane, and reinforce and stabilize the clamping units C.

Each tie unit T includes an elongate horizontally disposed tie bar 90, extending transverse of the frame, a bushing 91 fixed to each end portion of the tie rod and adapted to slidably enter between the legs of the yokes on the clamping units related thereto, elongate links 92 pivotally engaged on the bushings 91 to occur adjacent and engage the outer edges of the yokes and to project forwardly in the direction of travel of the chain Y, and to pivotally engage the bushing 91 on the next forward tie unit T, laterally outwardly of the links 92 thereon, spool-type rollers or wheels 93 rotatably carried on the rods 90, laterally outward of the links 92 and adapted to engage the return track 17, and retaining nuts 94 engaged on the outer ends of the tie rods to retain the rollers 94 and the links 92 in proper running engagement on the rod and against the bushings.

The rods 90 are engaged in the channels 35 of the stringers 34 of the upper spring-loaded feed roller 12, as they are advanced forwardly, downwardly, and then rearwardly in the press. As they reach the lower part of the roller 12 they are urged into pressure engagement with the stack of wood W by the roller 12, and serve to clamp the wood vertically against the beam of the clamp member C related thereto.

As the yokes 53 of the clamp units advance upwardly and rearwardly with the roller 13, and as the tie units T advance downwardly and rearwardly with the roller 12, the bushings 91 at the ends of the tie rods 90 slidably enter between the legs of the yokes 53 related thereto.

In order to assure proper feeding of the tie units into engagement with the clamp units, the upper feed roller 12 is spaced slightly rearwardly and above the feed roller 13, as clearly illustrated in the drawings, and as previously set forth.

After the related tie and clamping units are fully engaged, in the manner set forth above, and are advanced rearwardly in the machine or press, the clamping units are energized, that is, the cylinder and ram units are actuated to exert lateral pressure onto the stack of wood W engaged therewith. Upon the exertion of such lateral pressure the tie rods are put in tension between the upper ends of the yokes related thereto and serve to tie the upper ends of the yokes together and prevent excessive adverse springing and/or flexing of the clamp units.

Further, when the tie units are thus engaged with the clamp units and put in tension, they are frictionally engaged with the yokes so as to prevent their being displaced vertically, that is, they are frictionally held down in tight clamped engagement with the wood.

The tie units T remain engaged with the clamping units C as they move rearwardly through the press and until they reach the rear portion of the press just in advance of the roller 14, where the clamping units are shifted out of engagement with the wood, that is, shifted to their unactuated position. The units T are then advanced rearwardly and upwardly by the roller 14 out of engagement with the yokes of the clamping units.

In practice, it may be necessary or desirable to provide guides 95 on the rear end of the frame to engage and guide the tie units T upwardly and out of engagement with the yokes as they move rearwardly (see FIG. 4). It is to be noted that the tie units are engaged and supported by the peripheral edges of the discs 41 of the roller 14, and that the roller 14 serves to guide the units upwardly and then forwardly into engagement with the upper return track 17 for forward movement and reengagement with the roller 12.

It is also to be noted that the tie chain Y is geared to and follows the driven clamping chain X by virtue of the interengaged relationship between the units C and T and their cooperative engagement with the wood W.

The length of the machine and the speed at which it operates are controlled or governed by the drying and curing rate of the glue and the rate at which the wood being worked upon can be handled. It is to be noted that the beams 50 of the clamping unit C and the tie bars 90 of the tie units T make only point contact with the wood being handled, so that no extensive mating surfaces are established between the wood and the press structure which would be subject to being bonded by excess glue squeezed from the wood pack, still further, it is to be noted that the entire construction is in the nature of an open framework which facilitates the application of heat on the wood pack as it is advanced through the machine and as might be desired or required as a result of the nature of the particular glue that is employed.

Heat, if required, could be provided by means of steam coils suspended in the frame to occur above and below the stack of wood W and the press structure engaged with said stack, or could be applied to the wood by a forced air furnace, remote from the press, and suitable ducts in and about the frame to direct heated air onto the wood. In FIG. 2 of the drawings I have indicated, in phantom lines, what may be heat ducts or heat coil cowlings 96. The ducts or cowls 96 are arranged within the frame A above and below the wood stack W.

Since the provision of heat may or may not be required, and since the means that can be employed to supply heat can vary widely without affecting the novelty of the invention, we will not burden this application with further illustration and description of such a means.

With the construction provided by the present invention, it will be apparent that by feeding suitably glued boards of any and varying lengths into the forward end of our new press, a continuous uniform laminated beam or slab, of indefinite length, can be advantageously and economically produced.

Having described only a typical preferred form and application of my invention, we do not wish to be limited or restricted to the specific details herein set forth, but wish to reserve to ourselves any variations or modifications that may appear to those skilled in the art and fall within the scope of the following claims.

Having described our invention, we claim:

1. A wood laminating press of the character referred to including, an elongate, endless chain of U-shaped clamping units each having a wood supporting beam, normally upwardly projecting yokes at each end of the beam and a hydraulic ram carried by one yoke and opposing the other yoke and adapted to exert pressure on wood supported on the beam, means for supporting and driving said chain and an elongate endless chain of elongate tie units, each unit including a tie bar to engage the wood supported by the clamping units and to engage and extend between the yokes of the clamping units.

2. A wood laminating press of the character referred to including, an elongate, endless chain extending longitudinally of and adapted to engage about three surfaces of an elongate stack of boards arranged in end-to-end and side-by-side relationship, a second elongate endless chain extending longitudinally of and adapted to engage the other side of the stack of boards and engaged with the first mentioned chain, a plurality of hydraulic rams carried by one of the chains each to engage and exert pressure on one side of the stack of wood, means for driving said chains to convey said stack of wood longitudinally, means for supporting said chains and means for controlling said rams.

3. A continuous press of the character referred to including, an elongate frame having front and rear ends, upper and lower elongate feed rollers rotatably supported at the front end of the frame and extending transversely thereof, upper and lower elongate return rollers rotatably supported at the rear end of the frame and extending transversely thereof, an endless clamp chain engaged about and extending between the lower feed and return rollers, an endless tie chain engaged about and extending between the upper feed and return rollers and engageable with the clamp chain and drive means rotating one of the rollers whereby the upper portion of the clamp chain and the lower portion of the tie chain are moved longitudinally rearwardly in the frame, said clamp chain including a plurality of like elongate C-clamps arranged in spaced parallel relationship and extending transversely of the frame, each C-clamp having an elongate horizontally disposed load supporting beam, outwardly projecting legs at the ends of the beam and at right angles to the beams, a horizontally disposed hydraulic ram unit carried by one leg and a link fixed to each end of the clamp and pivotally connected with the end of the next adjacent clamp, said tie chain including a plurality of elongate horizontally disposed tie rods arranged in spaced parallel relationship and extending transverse of the frame, each rod having ends engageable with the outer ends of the legs of the C-clamps and a link at each end and pivotally connected with the adjacent end of the next adjacent tie rod.

4. A continuous press of the character referred to including, an elongate frame having front and rear ends, upper and lower elongate feed rollers rotatably supported at the front end of the frame and extending transversely thereof, upper and lower elongate return rollers rotatably supported at the rear end of the frame and extending transversely thereof, an endless clamp chain engaged about and extending between the lower feed and return rollers, an endless tie chain engaged about and extending between the upper feed and return rollers and engageable with the clamp chain and drive means rotating one of the rollers whereby the upper portion of the clamp chain and the lower portion of the tie chain are moved longitudinally rearwardly in the frame, said clamp chain including a plurality of like elongate C-clamps arranged in spaced parallel relationship and extending transversely of the frame, each C-clamp having an elongate horizontally disposed load supporting beam, outwardly projecting legs at the ends of the beam and at right angles to the beam, a horizontally disposed hydraulic ram unit carried by one leg and a link fixed to each end of the clamp and pivotally connected with the end of the next adjacent clamp, said tie chain including a plurality of elongate horizontally disposed tie rods arranged in spaced parallel relationship and extending transverse of the frame, each rod having ends engageable with the outer ends of the legs of the C-clamps and a link at each end and pivotally connected with the adjacent end of the next adjacent tie rod, said frame having longitudinal tracks extending between the front and rear portions thereof and supporting the upper portions of the tie and clamp chains and the lower portion of the clamp chain.

5. A continuous press of the character referred to including, an elongate frame having front and rear ends, upper and lower elongate feed rollers rotatably supported at the front end of the frame and extending transversely thereof, upper and lower elongate return rollers rotatably supported at the rear end of the frame and extending transversely thereof, an endless clamp chain engaged about and extending between the lower feed and return rollers, an endless tie chain engaged about and extending between the upper feed and return rollers and engageable with the clamp chain and drive means rotating one of the rollers whereby the upper portion of the clamp chain and the lower portion of the tie chain are moved longitudinally rearwardly in the frame, said clamp chain including a plurality of like elongate C-clamps arranged in spaced parallel relationship and extending transversely of the frame, each C-clamp having an elongate horizontally disposed load supporting beam, outwardly projecting legs at the ends of the beam and at right angles to the beam, a horizontally disposed hydraulic ram unit carried by one leg and a link fixed to each end of the clamp and pivotally connected with the end of the next adjacent clamp, said tie chain including a plurality of elongate horizontally disposed tie rods arranged in spaced parallel relationship and extending transverse of the frame, each rod having ends engageable with the outer ends of the legs of the C-clamps and a link at each end and pivotally connected with the adjacent end of the next adjacent tie rod, said frame having longitudinal tracks extending between the front and rear portions thereof and supporting the upper portions of the tie and clamp chains and the lower portion of the clamp chain, said chains having supporting wheels to engage the tracks.

6. A continuous press of the character referred to including, an elongate frame having front and rear ends, upper and lower elongate feed rollers rotatably supported at the front end of the frame and extending transversely thereof, upper and lower elongate return rollers rotatably supported at the rear end of the frame and extending transversely thereof, an endless clamp chain engaged about and extending between the lower feed and return rollers, an endless tie chain engaged about and extending between the upper feed and return rollers and engageable with the clamp chain and drive means rotating one of the rollers whereby the upper portion of the clamp chain and the lower portion of the tie chain are moved longitudinally rearwardly in the frame, said clamp chain including a plurality of like elongate C-clamps arranged in spaced parallel relationship and extending transversely of the frame, each C-clamp having an elongate horizontally disposed load supporting beam, outwardly projecting legs at the ends of the beam and at right angles to the beam, a horizontally disposed hydraulic ram unit carried by one leg and a link fixed to each end of the clamp and pivotally connected with the end of the next adjacent clamp, said tie chain including a plurality of elongate horizontally disposed tie bars arranged in spaced parallel relationship and extending transverse of the frame, each bar having ends engageable with the outer ends of the legs of the C-clamps and a link at each end and pivotally connected with the adjacent end of the next adjacent tie bar, said frame having longitudinal tracks extending between the front and rear portions thereof and supporting the upper portions of the tie and clamp chains and the lower portion of the clamp chain, said tie bars and C-clamps having supporting wheels rotatably mounted at their opposite ends and engaging the tracks.

7. A continuous press of the character referred to including, an elongate frame having front and rear ends, upper and lower elongate feed rollers rotatably supported at the front end of the frame and extending transversely thereof, upper and lower elongate return rollers rotatably supported at the rear end of the frame and extending transversely thereof, an endless clamp chain engaged about and extending between the lower feed and return rollers, an endless tie chain engaged about and extending between the upper feed and return rollers and engageable with the clamp chain and drive means rotating one of the rollers whereby the upper portion of the clamp chain and the lower portion of the tie chain are moved longitudinally rearwardly in the frame, said clamp chain including a plurality of like elongate C-clamps arranged in spaced parallel relationship and extending transversely of the frame, each C-clamp having an elongate horizontally disposed load supporting beam, outwardly projecting legs at the ends of the beam and at right angles to the beams, a horizontally disposed hydraulic ram unit carried by one leg and a link fixed to each end of the clamp and pivotally connected with the end of the next adjacent clamp, said tie chain including a plurality of elongate horizontally disposed tie rods arranged in spaced parallel relationship and extending transverse of the frame, each rod having ends engageable with the outer ends of the legs of the C-clamps and a link at each end and pivotally connected with the adjacent end of the next adjacent tie rod, said lower feed roller having axially extending load supporting stringers to engage and support the beams of the C-clamp and radially outwardly projecting dogs to engage the trailing edge of the C-clamps.

8. A continuous press of the character referred to including, an elongate frame having front and rear ends, upper and lower elongate feed rollers rotatably supported at the front end of the frame and extending transversely thereof, upper and lower elongate return rollers rotatably supported at the rear end of the frame and extending transversely thereof, an endless clamp chain engaged about and extending between the lower feed and return rollers, an endless tie chain engaged about and extending between the upper feed and return rollers and engageable with the clamp chain and drive means rotating one of the rollers whereby the upper portion of the clamp chain and the lower portion of the tie chain are moved longitudinally rearwardly in the frame, said clamp chain including a plurality of like elongate C-clamps arranged in spaced parallel relationship and extending transversely of the frame, each C-clamp having an elongate horizontally disposed load supporting beam, outwardly projecting legs at the ends of the beam and at right angles to the beam, a horizontally disposed hydraulic ram unit carried by one leg and a link fixed to each end of the clamp and pivotally connected with the end of the next adjacent clamp, said tie chain including a plurality of elongate horizontally disposed tie bars arranged in spaced parallel relationship and extending transverse of the frame, each bar having ends engageable with the outer ends of the C-clamps and a link at each end pivotally connected with the adjacent end of the next adjacent tie bar, said frame having longitudinal tracks extending between the front and rear portions thereof and supporting the upper portions of the tie and clamp chains and the lower portion of the clamp chain, said tie bars and C-clamps having supporting wheels rotatably mounted at their opposite ends and engaging the tracks, said lower feed roller having axially extending load supporting stringers to engage and support the beams of the C-clamp and radially outwardly projecting dogs to engage the trailing edge of the C-clamps.

9. A continuous press of the character referred to including, an elongate frame having front and rear ends, upper and lower elongate feed rollers rotatably supported at the front end of the frame and extending transversely thereof, upper and lower elongate return rollers rotatably supported at the rear end of the frame and extending transversely thereof, an endless clamp chain engaged about and extending between the lower feed and return rollers, an endless tie chain engaged about and extending between the upper feed and return rollers and engageable with the clamp chain and drive means rotating one of the rollers whereby the upper portion of the clamp chain and the lower portion of the tie chain are moved longitudinally rearwardly in the frame, said clamp chain including a plurality of like elongate C-clamps arranged in spaced parallel relationship and extending transversely of the frame, each C-clamp having an elongate horizontally disposed load supporting beam, outwardly projecting legs at the ends of the beam and at right angles to the beams, a horizontally disposed hydraulic ram unit carried by one leg and a link fixed to each end of the clamp and pivotally connected with the end of the next adjacent clamp, said tie chain including a plurality of elongate horizontally disposed tie rods arranged in spaced parallel relationship and extending transverse of the frame, each rod having ends engageable with the outer ends of the legs of the C-clamps and a link at each end and pivotally connected with the adjacent end of the next adjacent tie rod, said upper feed roller having axially extending stringers with radially outwardly opening channels to receive and establish driving engagement with the tie rods.

10. A continuous press of the character referred to including, an elongate frame having front and rear ends, upper and lower elongate feed rollers rotatably supported at the front end of the frame and extending transversely thereof, upper and lower elongate return rollers rotatably supported at the rear end of the frame and extending transversely thereof, an endless clamp chain engaged about and extending between the lower feed and return rollers, an endless tie chain engaged about and extending between the upper feed and return rollers and engageable with the clamp chain and drive means rotating one of the rollers whereby the upper portion of the clamp chain and the lower portion of the tie chain are moved longitudinally rearwardly in the frame, said clamp chain including a plurality of like elongate C-clamps arranged in spaced parallel relationship and extending transversely of the frame, each C-clamp having an elongate horizontally disposed load supporting beam, outwardly projecting legs at the ends of the beam and at right angles to the beam, a horizontally disposed hydraulic ram unit carried by one leg and a link fixed to each end of the clamp and pivotally connected with the end of the next adjacent clamp, said tie chain including a plurality of elongate horizontally disposed tie rods arranged in spaced parallel relationship and extending transverse of the frame, each rod having ends engageable with the outer ends of the legs of the C-clamps and a link at each end and pivotally connected with the adjacent end of the next adjacent tie rod, said frame having longitudinal tracks extending between the front and rear portions thereof and supporting the upper portions of the tie and clamp chains and the lower portion of the clamp chain, said tie rods and C-clamps having supporting wheels rotatably mounted at their opposite ends and engaging the tracks, said upper feed roller having axially extending stringers with radially outwardly opening channels to receive and establish driving engagement with the tie rods.

11. A continuous press of the character referred to including, an elongate frame having front and rear ends, upper and lower elongate feed rollers rotatably supported at the front end of the frame and extending transversely thereof, upper and lower elongate return rollers rotatably supported at the rear end of the frame and extending transversely thereof, an endless clamp chain engaged about and extending between the lower feed and return rollers, an endless tie chain engaged about and extending between the upper feed and return rollers and engageable with the clamp chain and drive means rotating one of the rollers whereby the upper portion of the clamp chain and the lower portion of the tie chain are moved longitudinally rearwardly in the frame, said clamp chain including a plurality of like elongate C-clamps arranged in spaced parallel relationship and extending transversely of the frame, each C-clamp having an elongate horizontally disposed load supporting beam, outwardly projecting legs at the ends of the beam and at right angles to the beam, a horizontally disposed hydraulic ram unit carried by one leg and a link fixed to each end of the clamp and pivotally connected with the end of the next adjacent clamp, said tie chain including a plurality of elongate horizontally disposed tie rods arranged in spaced parallel relationship and extending transverse of the frame, each rod having ends engageable with the outer ends of the legs of the C-clamps and a link at each end pivotally connected with the adjacent end of the next adjacent tie rod, said frame having longitudinal tracks extending between the front and rear portions thereof and supporting the upper portions of the tie and clamp chains and the lower portion of the clamp chain, said tie rods and C-clamps having supporting wheels rotatably mounted at their opposite ends and engaging the tracks, said lower feed roller having axially extending load supporting stringers to engage and support the beams of the C-clamp and radially outwardly projecting dogs to engage the trailing edge of the C-clamps, said upper feed roller having axially extending stringers with radially outwardly opening channels to receive and establish driving engagement with the tie rods.

12. A continuous press of the character referred to including, an elongate frame having front and rear ends, upper and lower elongate feed rollers rotatably supported at the front end of the frame and extending transversely thereof, upper and lower elongate return rollers rotatably supported at the rear end of the frame and extending transversely thereof, an endless clamp chain engaged about and extending between the lower feed and return rollers, an endless tie chain engaged about and extending between the upper feed and return rollers and engageable with the clamp chain and drive means rotating one of the rollers whereby the upper portion of the clamp chain and the lower portion of the tie chain are moved longitudinally rearwardly in the frame, said clamp chain including a plurality of like elongate C-clamps arranged in spaced parallel relationship and extending transversely of the frame, each C-clamp having an elongate horizontally disposed load supporting beam, outwardly projecting legs at the ends of the beam and at right angles to the beams, a horizontally disposed hydraulic ram unit carried by one leg and a link fixed to each end of the clamp and pivotally connected with the end of the next adjacent clamp, said tie chain including a plurality of elongate horizontally disposed tie rods arranged in spaced parallel relationship and extending transverse of the frame, each rod having ends engageable with the outer ends of the legs of the C-clamps and a link at each end and pivotally connected with the adjacent end of the next adjacent tie rod, fluid pressure supply means carried by the clamp chain and valving means carried by the clamp chain, related to the fluid supply means and the ram units of the C-clamp and operable to shift the rams laterally inwardly when they occur at the upper portion of the chain and between the rollers and to shift the rams laterally and outwardly when they occur adjacent the rollers and the lower portion of the chain.

13. A continuous press of the character referred to including, an elongate frame having front and rear ends, upper and lower elongate feed rollers rotatably supported at the front end of the frame and extending transversely thereof, upper and lower elongate return rollers rotatably supported at the rear end of the frame and extending transversely thereof, an endless clamp chain engaged about and extending between the lower feed and return rollers, an endless tie chain engaged about and extending between the upper feed and return rollers and engageable with the clamp chain and drive means rotating one of the rollers whereby the upper portion of the clamp chain and the lower portion of the tie chain are moved longitudinally rearwardly in the frame, said clamp chain including a plurality of like elongate C-clamps arranged in spaced parallel relationship and extending transversely of the frame, each C-clamp having an elongate horizontally disposed load supporting beam, outwardly projecting legs at the ends of the beam and at right angles to the beam, a horizontally disposed hydraulic ram unit carried by one leg and a link fixed to each end of the clamp and pivotally connected with the end of the next adjacent clamp, said tie chain including a plurality of elongate horizontally disposed tie rods arranged in spaced parallel relationship and extending transverse of the frame, each rod having ends engageable with the outer ends of the legs of the C-clamps and a link at each end pivotally connected with the adjacent end of the next adjacent tie rod, said frame having longitudinal tracks extending between the front and rear portions thereof and supporting the upper portions of the tie and clamp chains and the lower portion of the clamp chain, said tie rods and C-clamps having supporting wheels rotatably mounted at their opposite ends and engaging the tracks, said lower feed roller having axially extending load supporting stringers to engage and support the beams of the C-clamp and radially outwardly projecting dogs to engage the trailing edge of the C-clamps, said upper feed roller having axially extending stringers with radially outwardly opening channels to receive and establish driving engagement with the rods, fluid pressure supply means carried by the clamp chain and valving means carried by the clamp chain, related to fluid supply means and the ram units of the C-clamp and operable to shift the rams laterally inwardly when they occur at the upper portion of the chain and between the rollers and to shift the rams laterally outwardly when they occur adjacent the rollers and the lower portion of the chain.

14. A continuous press of the character referred to including, an elongate frame having front and rear ends, upper and lower elongate feed rollers rotatably supported at the front end of the frame and extending transversely thereof, upper and lower elongate return rollers rotatably supported at the rear end of the frame and extending transversely thereof, an endless clamp chain engaged about and extending between the lower feed and return rollers, an endless tie chain engaged about and extending between the upper feed and return rollers and engageable with the clamp chain and drive means rotating one of the rollers whereby the upper portion of the clamp chain and the lower portion of the tie chain are moved longitudinally rearwardly in the frame, said clamp chain including a plurality of like elongate C-clamps arranged in spaced parallel relationship and extending transversely of the frame, each C-clamp having an elongate horizontally disposed load supporting beam, outwardly projecting legs at the ends of the beam and at right angles to the beams, a horizontally disposed hydraulic ram unit carried by one leg and a link fixed to each end of the clamp and pivotally connected with the end of the next adjacent clamp, said tie chain including a plurality of elongate horizontally disposed tie rods arranged in spaced parallel relationship and extending transverse of the frame, each rod having ends engageable with the outer ends of the legs of the C-clamps and a link at each end and pivotally connected with the adjacent end of the next adjacent tie rod, fluid pressure supply means carried by the clamp chain and valving means carried by the clamp chain, related to the fluid supply means and the ram units of the C-clamp and operable to shift the rams laterally inwardly when they occur at the upper portion of the chain and between the rollers and to shift the rams laterally and outwardly when they occur adjacent the rollers and the lower portion of the chain, said fluid pressure supply means including a plurality of electric pumps having inlet and outlet fittings carried by the clamp chain in circumferentially spaced relationship, endless delivery and return ducts carried by the clamp chain and connected with the outlet and inlet fittings, respectively, each ram unit including an elongate cylinder with inlet and outlet fittings at is opposite ends, said valving means including a two-way valve related to each ram unit and connected with the delivery and return ducts and with the inlet and outlet fittings of the ram unit, said valve having an operating stem engageable with parts on the frame whereby the valve is actuated to effect operation of the ram related thereto.

15. A continuous press of the character referred to including, an elongate frame having front and rear ends, upper and lower elongate feed rollers rotatably supported at the front end of the frame and extending transversely thereof, upper and lower elongate return rollers rotatably supported at the rear end of the frame and extending transversely thereof, an endless clamp chain engaged about and extending between the lower feed and return rollers, an endless tie chain engaged about and extending between the upper feed and return rollers and engageable with the clamp chain and drive means rotating one of the rollers whereby the upper portion of the clamp chain and the lower portion of the tie chain are moved longitudinally rearwardly in the frame, said clamp chain including a plurality of like elongate C-clamps arranged in spaced parallel relationship and extending transversely of the frame, each C-clamp having an elongate horizontally disposed load supporting beam, outwardly projecting legs at the ends of the beam and at right angles to the beam, a horizontally disposed hydraulic ram unit carried by one leg and a link fixed to each end of the clamp and pivotally connected with the end of the next adjacent clamp, said tie chain including a plurality of elongate horizontally disposed tie rods arranged in spaced parallel relationship and extending transverse of the frame, each rod having ends engageable with the outer ends of the legs of the C-clamps and a link at each end pivotally connected with the adjacent end of the next adjacent tie rod, said frame having longitudinal tracks extending between the front and rear portions thereof and supporting the upper portions of the tie and clamp chains and the lower portion of the clamp chain, said tie rods and C-clamps having supporting wheels rotatably mounted at their opposite ends and engaging the tracks, said lower feed roller having axially extending load supporting stringers to engage and support the beams of the C-clamps and radially outwardly projecting dogs to engage the trailing edge of the C-clamps, said upper feed roller having axially extending stringers with radially outwardly opening channels to receive and establish driving engagement with the rods, fluid pressure supply means carried by the clamp chain and valving means carried by the clamp chain, related to fluid supply means and the ram units of the C-clamp and operable to shift the rams laterally inwardly when they occur at the upper portion of the chain and between the rollers and to shift the rams laterally outwardly when they occur adjacent the rollers and the lower portion of the chain, said fluid pressure supply means including a plurality of electric pumps having inlet and outlet fittings carried by the clamp chain in circumferentially spaced relationship, endless delivery and return ducts carried by the clamp chain and connected with the outlet and inlet fittings, respectively, each ram unit including an elongate cylinder with inlet and outlet fittings at its opposite ends, said valving means including a two-way valve related to each ram unit and connected with the delivery and return ducts and with the inlet and outlet fittings of the ram unit, said valve having an operating stem engageable with parts on the frame whereby the valve is actuated to effect operation of the ram related thereto.

16. A wood laminating press including, an elongate, endless chain of clamping units each having an elongate wood supporting beam, normally upwardly projecting yokes at each end of the beam and a pressure exerting means carried by one yoke and opposing the other yoke to exert pressure on wood supported on the beam, means for supporting and driving said chain and an elongate endless chain of elongate tie units, each unit including a tie bar to engage the wood supported by the clamp units and to engage and extend between the yokes of the clamping units.

17. A continuous press including, an elongate frame having front and rear ends, a pair of elongate feed rollers rotatably supported in parallel relationship at the front end of the frame, a pair of elongate return rollers rotatably supported in parallel relationship at the rear end of the frame, an endless clamp chain engaged about and extending between one of said feed rollers and one of said return rollers, an endless tie chain engaged about and extending between the other of said feed rollers and the other of said return rollers and engageable with the clamp chain, said chain having adjacent parallel forces extending longitudinally of the frame and drive means rotating one of the rollers whereby the adjacent portions of the chains are moved longitudinally rearwardly in the frame, said clamp chain including a plurality of like elongate clamps arranged in spaced parallel relationship each clamp having an elongate horizontally-disposed load-supporting beam, outwardly-projecting legs at the ends of the beams and at right angles to the beams, a horizontally-disposed jack-type pressure exerting unit carried by one leg and a link fixed to each end of the clamp and pivotally connected with the end of the next adjacent clamp, said tie chain including a plurality of elongate horizontally-disposed tie rods arranged in spaced parallel relationship, each rod having ends engageable with the outer ends of the legs of the clamps and a link at each end pivotally connected with the adjacent end of the next adjacent tie rod.

18. A continuous press including, an elongate frame having front and rear ends, upper and lower elongate feed rollers rotatably supported at the front end of the frame and extending transversely thereof, upper and lower elongate return rollers rotatably supported at the rear end of the frame and extending transversely thereof, an endless clamp chain engaged about and extending between the lower feed and return rollers, an endless tie chain engaged about and extending between the upper feed and return rollers and engageable with the clamp chain and drive means rotating one of the rollers whereby the upper portion of the clamp chain and the lower portion of the tie chain are moved longitudinally rearwardly in the frame, said clamp chain including a plurality of like elongate clamps arranged in spaced parallel relationship and extending transversely of the frame, each clamp having an elongate horizontally-disposed load-supporting beam, outwardly-projecting legs at the ends of the beam and at right angles to the beam, a horizontally-disposed jack unit carried by one leg and a link fixed to each end of the clamp and pivotally connected with the end of the next adjacent clamp, said tie chain including a plurality of elongate horizontally-disposed tie rods arranged in spaced parallel relationship and extending transverse of the frame, each rod having ends engageable with the outer ends of the legs of the clamps and a link at each end and pivotally connected with the adjacent end of the next adjacent tie rod, said frame having longitudinal tracks extending between the front and rear portions thereof and supporting the upper portion of the clamp chain.

19. A continuous press including, an elongate frame having front and rear ends, an elongate feed roller rotatably supported at the front end of the frame and extending transversely thereof, an elongate return roller rotatably supported at the rear end of the frame and extending transversely thereof, an endless clamp chain engaged about and extending between the feed and return rollers, drive means rotating one of said rollers whereby the upper portion of the chain is moved longitudinally rearwardly in the frame, said chain including a plurality of like elongate clamps arranged in spaced parallel relationship and extending transverse the frame, each clamp having an elongate horizontally-disposed load-supporting beam, outwardly-projecting legs at the ends of the beam and at right angles to the beam, a horizontally-disposed jack unit carried by one leg and shiftably carrying a pressure plate opposing the other leg and engageable with work supported on the beam, a track-engaging roller rotatably supported at each end of the clamp and a link fixed to each end of the clamp and pivotally connected with the adjacent end of the next adjacent clamp, said frame having longitudinal tracks extending between the front and rear portions thereof and engageable with the rollers on the clamps at the upper portion of the chain to support said upper portion of the chain, and operating means for the jack units to shift said units into pressure-engagement with the work at the forward portion of the frame and to shift said jack units from engagement with the work at the rear portion of the frame.

20. A wood laminating press including, an elongate endless chain of U-shaped clamps extending transverse the chain in longitudinal spaced parallel relationship with each other, said chain having a portion extending longitudinally of and adapted to engage about three surfaces of an elongate stack of boards arranged in end-to-end and side-by-side relationship, each clamp having a pressure exerting jack at one end and shiftable into and out of pressure engagement on the adjacent side edge of the stack of boards, means for driving said chain to convey said stack of boards longitudinally, means for supporting said chain and means for controlling said jacks.

References Cited in the file of this patent

UNITED STATES PATENTS

| | | |
|---|---|---|
| 2,526,342 | Frisch | Oct. 17, 1950 |
| 2,633,166 | Gillespie et al. | Mar. 31, 1953 |
| 2,671,481 | Quick | Mar. 9, 1954 |

FOREIGN PATENTS

| | | |
|---|---|---|
| 649,345 | Great Britain | Jan. 4, 1951 |